(12) United States Patent
Stephen et al.

(10) Patent No.: US 7,697,551 B2
(45) Date of Patent: Apr. 13, 2010

(54) SYSTEM FOR INSTANT MESSAGE TO TELEPHONE SPEECH AND BACK

(75) Inventors: Razeyah Stephen, Marlboro, MA (US); Mary Ellen Zurko, Groton, MA (US)

(73) Assignee: Nuance Communications, Inc., Burlington, MA (US)

( * ) Notice: Subject to any disclaimer, the term of this patent is extended or adjusted under 35 U.S.C. 154(b) by 776 days.

(21) Appl. No.: 11/469,601

(22) Filed: Sep. 1, 2006

(65) Prior Publication Data

US 2008/0056283 A1 Mar. 6, 2008

(51) Int. Cl.
*H04L 12/66* (2006.01)
*H04M 11/00* (2006.01)
*G06F 15/16* (2006.01)

(52) U.S. Cl. ............. 370/401; 370/352; 370/356; 379/88.14; 709/206

(58) Field of Classification Search ......... 370/356–401, 370/352–355; 379/201–204, 52–93; 709/204–206, 709/227–249
See application file for complete search history.

(56) References Cited

U.S. PATENT DOCUMENTS

| | | | |
|---|---|---|---|
| 6,173,250 B1 * | 1/2001 | Jong | 704/3 |
| 6,697,474 B1 * | 2/2004 | Hanson et al. | 379/201.01 |
| 6,757,365 B1 * | 6/2004 | Bogard | 379/88.17 |
| 6,876,728 B2 * | 4/2005 | Kredo et al. | 379/88.17 |
| 6,950,500 B1 * | 9/2005 | Chaturvedi et al. | 379/52 |
| 6,950,501 B1 * | 9/2005 | Chaturvedi et al. | 379/52 |
| 7,382,868 B2 * | 6/2008 | Moore et al. | 379/114.01 |
| 7,506,029 B2 * | 3/2009 | Sanjeeva et al. | 709/206 |
| 7,512,217 B2 * | 3/2009 | Greenwood | 379/88.14 |
| 2002/0071539 A1 | 6/2002 | Diament et al. | |
| 2003/0087632 A1 | 5/2003 | Sagi et al. | |
| 2003/0187641 A1 | 10/2003 | Moore et al. | |
| 2003/0229722 A1 | 12/2003 | Beyda | |
| 2004/0186909 A1 | 9/2004 | Greenwood | |
| 2004/0267527 A1 | 12/2004 | Creamer et al. | |
| 2007/0150278 A1 | 6/2007 | Bates et al. | |

* cited by examiner

*Primary Examiner*—M. Phan
(74) *Attorney, Agent, or Firm*—Wolf, Greenfield & Sacks, P.C.

(57) ABSTRACT

A system for converting instant messaging (IM) text to telephone speech and back. The system includes a first electronic device configured to transmit and receive IM text. A translation module is housed inside the first electronic device. The translation module is configured to perform (i) translate the outgoing IM text into speech, and (ii) translate incoming speech into IM text. The system further includes a second electronic device communicatively coupled by way of a network to the first electronic device such that the second electronic device may receive the IM text as translated speech from the first electronic device via a call.

10 Claims, 1 Drawing Sheet

SYSTEM FOR INSTANT MESSAGE TO TELEPHONE SPEECH AND BACK

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates in general to communications and, more particularly, to translating an instant message text to telephone speech.

2. Description of Background

Professionals are always on the move; they have busy schedules that are generally packed with numerous meetings. Quite often, a professional finds himself/herself sitting in a meeting that continues to drag on in time. Generally, as the length of the meeting continues to grow in duration the professional becomes less than fully engaged. Normally, at this time, the professional starts to engage in other business activities such as e-mailing and instant messaging colleagues, customers, etc.

For whatever reason, the professional determines that he/she needs to have a really short conversation with someone, for example, the professional is running late to a meeting with a customer and needs to negotiate a change of plans with the customer, or the professional views an announcement on the web that he/she feels should be addressed by himself/herself or a colleague, etc. As such, the professional attempts to contact the other person via instant messaging (IM) but is unsuccessful. E-mail is a viable option but is unlikely to work because of it's batch nature or the other person's intermittent use.

Thus, there is a need for using IM to phone the person and be able to engage in a short conversation with the person where the typed IM is translated to speech. Conversely, the other person's speech is translated to text when the person responds. Since talking in the meeting is rude and the professional does not want to prematurely leave the meeting this would allow the professional to communicate with others outside the meeting while still attending the meeting.

SUMMARY OF THE INVENTION

The shortcomings of the prior art are overcome and additional advantages are provided through the provision of a system for converting instant messaging (IM) text to telephone speech and back. The system includes a first electronic device configured to transmit and receive IM text. The system further includes a translation module housed inside the first electronic device. The translation module is configured to (i) translate outgoing IM text into speech, and (ii) translate incoming speech into IM text. The system further includes a second electronic device that is communicatively coupled by way of a network to the first electronic device such that the second electronic device may receive the IM text as translated speech from the first electronic device via a call.

Additional features and advantages are realized through the techniques of the present invention. Other embodiments and aspects of the invention are described in detail herein and are considered a part of the claimed invention. For a better understanding of the invention with advantages and features, refer to the description and to the drawing.

TECHNICAL EFFECTS

As a result of the summarized invention, technically we have achieved a solution for a system for converting instant messaging (IM) text to telephone speech and back.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawing in which:

Figure 1:
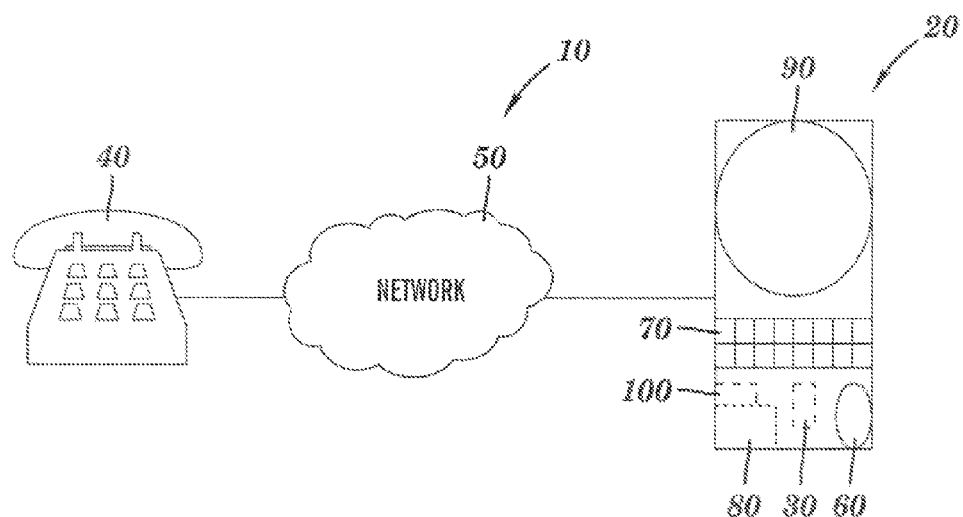
FIG. 1 illustrates one example of a system for converting instant messaging (IM) text to telephone speech and back.

The detailed description explains an exemplary embodiment of the invention, together with advantages and features, by way of example with reference to the drawing.

DETAILED DESCRIPTION OF THE INVENTION

Referring to FIG. 1, a system 10 for converting instant messaging (IM) text to telephone speech, is shown. The system 10 includes a first electronic device 20 that is configured to transmit and receive IM text. As shown in FIG. 1, the first electronic device 20 may be a PDA with IM capability or another device such as a wireless phone, a laptop with IM capability, etc.

A translation module 30 is housed inside the first electronic device 20. The translation module 30 is configured to perform at least one of the following functions: (i) translate the IM text into speech, and (ii) translate speech into IM text.

A second electronic device 40 is communicatively coupled by way of a network 50 to the first electronic device such that the second electronic device 40 may receive the IM text as translated speech from the first electronic device 20 via a cell. As shown, the second electronic device 40 is a telephone but other devices such as a cell phone, etc. may be used as the recipient device.

The first electronic device 20 includes a selection member 60 that allows a user to select at least one of: (i) transmit the IM text to a recipient without translating the text to speech and receive the corresponding reply from the recipient as IM text. Secondly, (ii) transmit the IM text to the recipient by translating the text to speech and translate the corresponding speech reply from the recipient as IM text.

The first electronic device 20 is further configured to play an announcement for the recipient once the recipient receives the call. The announcement being at least of: (i) a standardized greeting pre-programmed into the first electronic device 20. Secondly, (ii) a personalized greeting programmed into the first electronic device 20 by the user of the first electronic device 20. The greeting may state that text messages from the sender are being converted to speech signals. Furthermore, the first electronic device 20 is further configured to provide a signal to the user of the first electronic device 20 that the recipient has answered the call. For example, the first electronic device 20 may yield an audible beep, vibration, etc., as a signal.

An input member 70 is included with the first electronic device 20 for imputing characters into the first electronic device 20 that form the IM text. As shown the input member 70 is a keypad but other forms of components may be used. Alternatively, the first electronic device 20 is further configured to initiate the call to the recipient when the user of the first electronic device 20 selects a telephone number to contact from a contact list 80 programmed into the first electronic device 20.

A display module 90 is included with the first electronic device 20 for displaying text and data. The first electronic device 20 further includes a processor 100 for interpreting and executing instructions entered in the first electronic device 20 via the input member. The translation module 30 may be an application executed by processor 100 to perform the text-to-speech conversion when sending a message and speech-to-text conversion when receiving a message.

Figure 2:
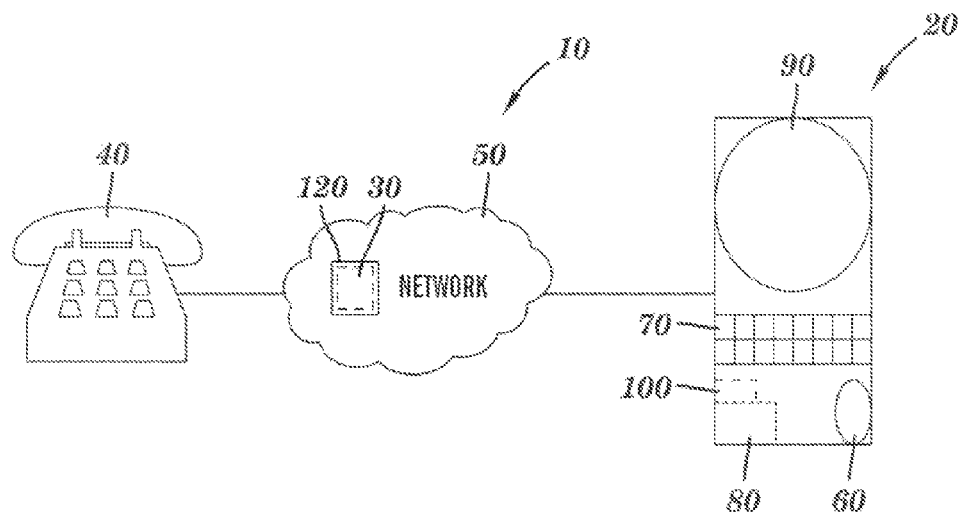
FIG. 2 illustrates another example of a system for converting instant messaging (IM) text to telephone speech and back.

Referring to FIG. 2, an alternative embodiment of the disclosed invention is shown. In this embodiment, the translation module 30 is housed inside a network element 120 and is communicatively coupled by way of the network 50 to the first electronic device 20. The translation module 30 is still configured to (i) translate the outgoing IM text into speech, and (ii) translate incoming speech into IM text. The second electronic device 40 is communicatively coupled by way of the network 120 to the first electronic device 20 such that the second electronic device 40 may receive the IM text as translated speech from the first electronic device 20 via a call.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for converting instant messaging (IM) text to telephone speech and back, comprising:
  a first electronic device configured to transmit and receive IM text and configured to transmit and receive speech; and
  a translation module housed inside the first electronic device, the translation module configured to (i) translate outgoing IM text into speech and (ii) translate incoming speech into IM text,
  wherein the first electronic device is further configured to transmit an announcement to a second electronic device communicatively coupled by way of a network to the first electronic device once the second electronic device receives a call from the first electronic device, the call comprising speech translated from IM text by the translation module, the announcement being at least one of, (i) a standardized greeting pre-programmed into the first electronic device, and (ii) a personalized greeting programmed into the first electronic device by a user of the first electronic device, the announcement indicating that the speech of the call has been translated from IM text.

2. The system of claim 1, wherein the first electronic device is further configured to provide a signal to the user of the first electronic device that a recipient using the second electronic device has answered the call.

3. The system of claim 2, wherein the first electronic device includes an input member for inputting characters into the first electronic device that form IM text.

4. The system of claim 3, wherein the first electronic device is further configured to initiate a call to the recipient when the user of the first electronic device selects a telephone number to contact from a contact list programmed into the first electronic device.

5. The system of claim 4, wherein the first electronic device includes a display module for displaying text and data.

6. A system for converting instant messaging (IM) text to telephone speech and back, comprising:
  a first electronic device configured to transmit and receive IM text;
  a translation module housed in a network element communicatively coupled by way of a network to the first electronic device, the translation module configured to (i) translate outgoing IM text into speech, and (ii) translate incoming speech into IM text; and
  a second electronic device communicatively coupled by way of the network to the first electronic device such that the second electronic device may receive IM text from the first electronic device as translated speech via a call,
  wherein the first electronic device is further configured to transmit an announcement to the second electronic device once the second electronic device receives the call from the first electronic device, the announcement being at least one of, (i) a standardized greeting pre-prograinmed into the first electronic device, and (ii) a personalized greetina programmed into the first electronic device by a user of the first electronic device, the announcement indicating that the translated speech of the call has been translated from IM text.

7. The system of claim 6, wherein the first electronic device is further configured to provide a signal to the user of the first electronic device that a recipient using the second electronic device has answered the call.

8. The system of claim 7, wherein the first electronic device includes an input member for inputting characters into the first electronic device that form IM text.

9. The system of claim 8, wherein the first electronic device is further configured to initiate a call to the recipient when the user of the first electronic device selects a telephone number to contact from a contact list programmed into the first electronic device.

10. The system of claim 9, wherein the first electronic device includes a display module for displaying text and data.

* * * * *

UNITED STATES PATENT AND TRADEMARK OFFICE
CERTIFICATE OF CORRECTION

PATENT NO. : 7,697,551 B2
APPLICATION NO. : 11/469601
DATED : April 13, 2010
INVENTOR(S) : Razeyah Stephen et al.

Page 1 of 1

It is certified that error appears in the above-identified patent and that said Letters Patent is hereby corrected as shown below:

At column 3, claim 1, line 43, "outgoing IM text into speech and (ii)" should read --outgoing IM text into speech, and (ii)--.

At column 4, claim 6, line 35, "prograinmed" should read --programmed--.

At column 4, claim 6, line 36, "greetina" should read --greeting--.

Signed and Sealed this

First Day of June, 2010

David J. Kappos
*Director of the United States Patent and Trademark Office*